(12) United States Patent
Noda

(10) Patent No.: US 6,800,108 B2
(45) Date of Patent: Oct. 5, 2004

(54) FILTER MADE OF POROUS CERAMIC SINTERED BODY

(75) Inventor: Naomi Noda, Ichinomiya (JP)

(73) Assignee: NGK Insulators, Ltd., Nagoya (JP)

( * ) Notice: Subject to any disclaimer, the term of this patent is extended or adjusted under 35 U.S.C. 154(b) by 7 days.

(21) Appl. No.: 10/221,365

(22) PCT Filed: Mar. 13, 2001

(86) PCT No.: PCT/JP01/01954
§ 371 (c)(1),
(2), (4) Date: Sep. 12, 2002

(87) PCT Pub. No.: WO01/72398
PCT Pub. Date: Oct. 4, 2001

(65) Prior Publication Data
US 2003/0029147 A1 Feb. 13, 2003

(51) Int. Cl.$^7$ ............................................. B01D 39/20
(52) U.S. Cl. ........................ 55/523; 55/282.3; 55/385.3; 55/DIG. 30; 60/311
(58) Field of Search ............................ 55/282.3, 385.3, 55/523, DIG. 10, DIG. 30; 60/311

(56) References Cited

U.S. PATENT DOCUMENTS

| 4,632,683 A | * | 12/1986 | Fukutani et al. ................ 55/523 |
| 5,069,697 A | | 12/1991 | Hamaguchi et al. |
| 5,198,006 A | * | 3/1993 | Mimori et al. ................ 55/523 |
| 5,545,243 A | | 8/1996 | Kotani et al. |
| 5,549,725 A | | 8/1996 | Kasai et al. |
| 6,227,382 B1 | * | 5/2001 | Cutler et al. ................ 210/473 |
| 6,541,407 B2 | * | 4/2003 | Beall et al. ................... 55/523 |
| 2003/0093982 A1 | * | 5/2003 | Suwabe et al. ............... 55/523 |

FOREIGN PATENT DOCUMENTS

| EP | 0 640 391 A2 | * | 8/1993 | ........... B01D/53/72 |
| JP | A 4-293508 | | 10/1992 | |
| JP | A 5-23512 | | 2/1993 | |
| JP | A 7-80226 | | 3/1995 | |
| JP | A 9-29024 | | 2/1997 | |
| WO | WO 00/76939 A1 | * | 12/2000 | ......... C04B/35/195 |

* cited by examiner

Primary Examiner—Duane Smith
Assistant Examiner—Jason M. Greene
(74) Attorney, Agent, or Firm—Oliff & Berridge, PLC

(57) ABSTRACT

The invention is directed to a filter made of a porous ceramics sintered body has a honeycomb structure having a large number of through channels partitioned by partition walls and passing through along an axial direction. When a ratio of a pore volume having a diameter of 30 μm or more to a total pore volume, measured by a method of mercury penetration, of the filter is P1(%) and a thickness of said partition wall is T (μm), these satisfy the relationship defined by the following formula: P1×10≦T. In case of this filter, one may produce it relatively easily on a large scale without adjustment requiring the change of the properties of material for a filter, and the filter can flexibly cope with various uses.

29 Claims, 1 Drawing Sheet

FILTER MADE OF POROUS CERAMIC SINTERED BODY

BACKGROUND OF THE INVENTION AND RELATED ART STATEMENT

The present invention relates to a filter made of a porous ceramic sintered body to scavenge particulates (fine particles) in fluid, which is represented by a diesel particulate filter.

The diesel particulate filter (DPF), which is a kind of filter of a porous ceramic sintered body, has a honeycomb structure having a large number of through channels (cells) partitioned by partition walls (libs) and passing through along an axial direction, and adjacent through channels are alternatively sealed at the opposite end mutually so that both end surfaces of the filter are clogged checkerwise.

When exhaust gas of a diesel engine is sent from one end surface of this honeycomb structure, exhaust gas containing particulates flows inside from the through channels which are not sealed in an end portion of the end surface, passes through the porous partition walls, and enters into the other through channels which are not sealed in the other end portion of the structure. And, when the exhaust gas passes through the partition walls, particulates in the exhaust gas are caught in partition walls and the purified exhaust gas from which the particulates are removed is exhausted from the other end of the structure.

In a filter of such a principle, there is a close relation among pore diameter of a porous ceramic sintered body composing a filter, scavenging efficiency of particulates, and pressure loss. For example, as shown in the specification of JP-A-5-23512, the fall in the scavenging efficiency cannot be avoided in a filter wherein large fine pores are also present. On the other hand, if the diameter of its fine pores become smaller, the pressure loss increases.

Therefore, the above-mentioned specification discloses a technique to set average pore diameter of a filter in a predetermined range and set standard deviation in distribution of pore diameters to be the predetermined value or less (that is, to make a large number of fine pores having pore diameters of a limited range present as much as possible) to provide a DPF having a low pressure loss and a high scavenging efficiency.

However, as shown in JP-A-5-23512, it is necessary to change qualities of materials, raw materials, a production method, and the like, of a filter from the foundation, thereby adjustment is inevitably required. In addition, there is a problem that it is impossible to produce any kind of filter having any average pore diameter and any distribution of pore diameter according to various kinds of uses, depending upon kinds of particulates, temperature for use, or the like.

The present invention has been made in view of such conventional circumstances and aims to provide a filter made of a porous ceramic sintered body which does not need adjustment on a large scale such as changing properties of material for the filter, which can be made relatively easily, and which can cope with various uses flexibly.

SUMMARY OF THE INVENTION

According to the present invention, there is provided a filter made of a porous ceramic sintered body (first aspect of the invention) having a honeycomb structure having a large number of through channels partitioned by partition walls and passing through along an axial direction, characterized in that when a ratio of a pore volume having a diameter of 30 μm or more to a total pore volume, measured by a method of mercury penetration, of the filter is P1(%) and a thickness of said partition wall is T (μm), these satisfy the relationship defined by the following formula:

$$P1 \times 10 \leq T.$$

According to the present invention, there is further provided a filter made of a porous ceramic sintered body (second aspect of the invention) having a honeycomb structure having a large number of through channels partitioned by partition walls and passing through along an axial direction, characterized in that when an average pore diameter, measured by a method of mercury penetration, of the filter is D (μm) and a thickness of the partition wall is T (μm), these satisfy the relationship defined by the following formula:

$$D \times 100 \geq T.$$

Further, according to the present invention, there is furthermore provided a filter made of a porous ceramic sintered body (third aspect of the invention) having a honeycomb structure having a lot of through channels partitioned by partition walls and passing through along an axial direction, wherein when a ratio of a pore volume having a diameter of below 6 μm to a total pore volume, measured by a method of mercury penetration, of the filter is P4 (%) and a thickness of said partition wall is T (μm), these satisfy the relationship defined by the following formula:

$$(1/P4) \times 3000 \geq T.$$

BEST MODE FOR CARRYING OUT THE INVENTION

Figure 1:
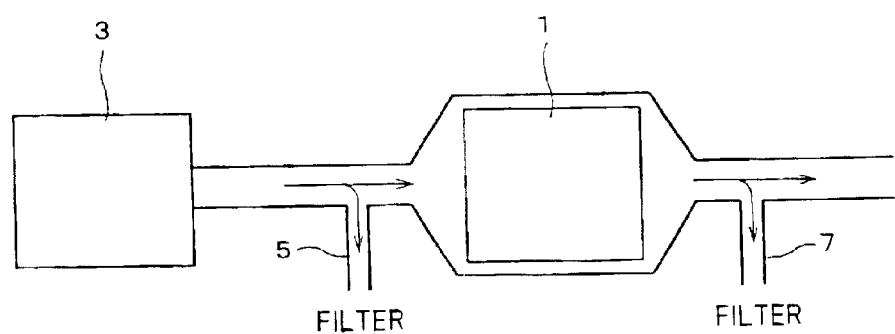
FIG. 1 is a schematic view showing a constitution of the device employed in the measurement of scavenge efficiency in Examples.

As described above, if there are many large fine pores in the filter, a part of the particulates, which are scavenging targets, pass through the partition wall without being captured by the partition wall and are discharged, and as a result, the reduction in the scavenging efficiency is brought about. On the contrary, a problem that a pressure loss increases as small fine pores increases is caused. However, these problems can be reduced by setting a thickness of partition walls within an appropriate range, and the result of studying the appropriate range zealously is the present invention.

To be specific, a rise in a pressure loss can be controlled by setting a thickness of the partition wall thick to prevent particulates from passing and raise the scavenging efficiency in the case that far larger fine pores coexist in a great number in filter-constituting material, and by setting a thickness of the partition wall thin in the case that smaller fine pores exist in a great number. By balancing both prevention of particulates from passing and suppression in increase of pressure loss, the present inventors have arrived at a filter of the present invention in which scavenging efficiency is suitably balanced with pressure loss. Because a technique of the present invention is a technique to devise so that a design of a filter, namely, a thickness of partition walls becomes appropriate unlike a technique in which a filter material itself is changed as in the aforementioned technique, the technique of the present invention can be performed relatively easily and can flexibly cope with miscellaneous uses. The first to the third aspects of the present invention are hereinbelow described in order.

The first aspect of the present invention is a filter made of a porous ceramics sintered body having a honeycomb structure having a large number of through channels partitioned by partition walls and passing through along an axial direction, wherein a thickness of the partition wall is set based on the ratio of a grand total of a pore volume having a pore diameter (a diameter) equal to or more than a predetermined value of filter-constituting material to the total pore volume.

Specifically, when a ratio of a pore volume having a diameter of 30 μm or more to a total pore volume, measured by a method of mercury penetration, of the filter is P1(%) and a thickness of the partition wall is T (μm), these satisfy the relationship defined by the following formula (1), preferably formula (2), and further preferably formula (3).

$$P1 \times 10 \leq T \quad (1)$$

$$P1 \times 15 \leq T \quad (2)$$

$$P1 \times 20 \leq T \quad (3)$$

These formulae (1)–(3) mean that the more far large fine pores having a diameter of 30 μm coexist, the more a value of the left side of the formulae increases, and the thicker a thickness of the partition wall is set. As a result of examination by the present inventors, it was found that high scavenging efficiency could be obtained in the case that the aforementioned P1 and T satisfy these relationships.

Further, in the first aspect of the present invention, when said ratio of a pore volume having a diameter of 60 μm or more to a total pore volume, measured by a method of mercury penetration, of the filter is P2 (%), and a thickness of the partition wall is T (μm), these preferably satisfy the relationship defined by the following formula (4) in view of a balance of scavenging efficiency with pressure loss, and more preferably satisfy the relationship defined by the following formula (5).

$$P2 \times 15 \leq T \quad (4)$$

$$P2 \times 45 \leq T \quad (5)$$

Next, the second aspect of the present invention is described. The second aspect of the present invention is a filter made of a porous ceramics sintered body having a honeycomb structure having a large number of through channels partitioned by partition walls and passing through along an axial direction, in which a thickness of the partition wall is set based on an average pore diameter of filter-constituting material.

Specifically, when an average pore diameter, measured by a method of mercury penetration, of the filter is D (μm) and a thickness of the partition wall is T (μm), these satisfy the relationship defined by the following formula (6), preferably the following formula (7), and more preferably the following formula (8).

$$D \times 100 \geq T \quad (6)$$

$$D \times 70 \geq T \quad (7)$$

$$D \times 50 \geq T \quad (8)$$

These formulae (6)–(8) means that the smaller an average pore diameter of the filter is, the smaller a value of the left side of the formulae becomes and the thinner the upper limit of a thickness of the partition wall is set. As a result of examination by the present inventors, it was found that a pressure loss could be suppressed in the case that the aforementioned D and T satisfy these relationships.

Further, in the second aspect of the present invention, when a ratio of a pore volume having a diameter of below 3 μm to a total pore volume, measured by a method of mercury penetration, of the filter is P3 (%) and a thickness of the partition wall is T (μm), these preferably satisfy the relationship defined by the following formula (9) in view of suppressing increase in pressure loss, and more preferably the following formula (10).

$$(1/P3) \times 1500 \geq T \quad (9)$$

$$(1/P3) \times 400 \geq T \quad (10)$$

In addition, in the second aspect of the invention, balance of scavenging efficiency with pressure loss can be made more adequate by combining the aforementioned first aspect of the present invention with the second aspect of the invention, i.e., by satisfying the relationships of the aforementioned formulae (1)–(3).

Next, the third aspect of the present invention is described. The third aspect of the present invention is a filter made of a porous ceramics sintered body having a honeycomb structure having a large number of through channels partitioned by partition walls and passing through along an axial direction, in which a thickness of the partition wall is set based on the ratio of a grand total of a pore volume having a pore diameter (a diameter) below a predetermined value of filter-constituting material to the total pore volume.

Specifically, when a ratio of a pore volume having a diameter of below 6 μm to a total pore volume, measured by a method of mercury penetration, of the filter is P4 (%) and a thickness of said partition wall is T (μm), these satisfy the relationship defined by the following formula (11), preferably the following formula (12), and more preferably the following formula (13).

$$(1/P4) \times 3000 \geq T \quad (11)$$

$$(1/P4) \times 2000 \geq T \quad (12)$$

$$(1/P4) \times 1300 \geq T \quad (13)$$

These formulae (11)–(13) means that the higher the number of small fine pores having a diameter below 6 μm is in the filter, the smaller a value of the left side is and the thinner a thickness of the partition wall is set. As a result of examination by the present inventors, it was found that pressure loss could be suppressed in the case that the aforementioned P4 and T satisfy these relationships.

Further, in the third invention like the second invention, when said ratio of a pore volume having a diameter of below 3 μm to a total pore volume, measured by a method of mercury penetration, of the filter is P3 (%) and a thickness of said partition wall is T (μm), these preferably satisfy the relationship defined by the aforementioned formula (9) or (10) in view of balance of scavenging efficiency with pressure loss.

In addition, in the third aspect of the present invention, increase in pressure loss can be suitably controlled by combining the aforementioned second aspect of the invention, i.e., by satisfying the relationships of the aforementioned formulae (6)–(8). Further, in the third aspect of the present invention, balance of scavenging efficiency with pressure loss can be made more adequate by combining the first aspect of the present invention with the third aspect of the present invention by satisfying relationships of the formulae (1)–(3).

The filters of the first-third aspects of the present invention can be particularly suitably employed as filters to sample particulates contained in exhaust gas of a diesel engine, that is, a DPF.

In the case that the filter of the present invention is used as a DPF, generally, adjacent through channels are alternatively sealed at the opposite end mutually so that both end surfaces of the filter having a honeycomb structure are clogged checkerwise. A technique of sealing is not particularly limited. However, it is preferable to embed a sealing material in an end portion of a cell from an end surface of the filter because of high sealability. In addition, it is preferable that the major ingredient of the sealing material is the same as the major ingredient of the honeycomb structure, which is the main body of the filter, because a coefficient of thermal expansion of both coincides with each other.

When exhaust gas of a diesel engine is sent from one end surface of such a filter, the exhaust gas flows into the filter from the through channels which are not sealed at one end side, passes through the porous partition wall, and enters the other through channels which are not sealed at the end of an other end side of the structure. When the exhaust gas passes through the partition walls, particulates in the exhaust gas are caught by the partition walls, and the purified exhaust gas from which particulates are removed is discharged from the other end side of the filter.

Since plugging would occur because of accumulation of caught particulates on the partition walls and a function as a filter drops, a filter is regularly heated by a heating means such as a heater to remove the particulates by combustion so that a function of the filter is revitalized. The filter may carry a catalyst component to promote combustion of the particulates at the revitalization.

In the present invention, sintered bodies of cordierite, silicon carbide (SiC), zirconyl phosphate, and the like, are given as preferred materials as a porous ceramics sintered body composing a filter. A filter of the present invention may have a unitary structure, or a plurality of segments of a porous ceramic sintered body composing a honeycomb structure may be unitarily joined to give a desired structure.

In addition, a filter of the present invention preferably has a porosity of 30–60%, and more preferably 40–55%. When the porosity of the filter is below 30%, permeation speed of a fluid as a filter is decreased remarkably, and when the porosity is above 60%, strength as a structure is deteriorated.

EXAMPLES

The present invention is described in more detail on the basis of Examples. However, the present invention is by no means limited to these Examples.

(Manufacture of Filter)

There were manufactured DPFs of cordierite and DPFs of SiC having a columnar shape of an outside shape having a diameter of 150 mm, a length of 150 mm, and various kinds of thickness of partition walls as shown in Tables 2 and 3. Thickness of the partition wall was varied by substituting nozzles used for a honeycomb extrusion molding. Thus produced cordierite DPFs and SiC DPFs were measured for a distribution of pore diameters (a diameter) and an average pore diameter (a diameter) by a method of mercury penetration, and results as in Table 1 could be obtained. As for DPFs of the same materials, because the same manufacturing method and the same raw material were employed even if a thickness of the partition wall is different from one another, the similar distribution of pore diameters and average pore diameter were shown.

(Measurement of Pressure Loss)

Each of thus produced PDFs was subjected to casing into a canned body and connected to a pressure-loss measuring device. 7 Nm$^3$/min. of air was sent to measure a difference in pressure in front and at the back of DPF, which was defined as the initial pressure loss. The measurement temperature was 20° C. Results of the measurement are shown in Table 2, and DPFs of Examples 1 to 4 of the present invention had low pressure power loss in comparison with the DPF of Comparative Example 1.

(Measurement of Soot Scavenge Efficiency)

As shown in FIG. 1, Each DPF 1 produced above was subjected to canning and connected to a soot generator 3. Sampling pipes 5 and 7, which can sample a little gas, were provided in front and at the back of the DPF 1, and filter paper was disposed in each of the sampling pipes. After gas including soot (particulates) generated with the soot generator 3 was sent into the DPF 1 and the sampling pipes 5 and 7 for 1 minute, the soot accumulating on the filter paper was weighed. A quantity of the soot accumulating on the filter paper arranged in the sampling pipe 5 in front of the DPF 1 (the upstream side) was defined as $S_1$, and a quantity of the soot accumulating on the filter paper arranged in the sampling pipe 7 at the back of the DPF 1 (the downstream side) was defined as $S_2$. Soot scavenge efficiency was obtained by the following formula. The results are shown in Table 3, and DPFs of Examples 5–8 of the present invention showed the high scavenge efficiency in comparison with the DPF of Comparative Example 2. It was found that the SiC DPF having a thickness of the partition wall of 12.0 mil (305 $\mu$m) is most preferable as a DPF generally because it showed the best soot scavenge efficiency and the lowest pressure loss in the aforementioned measurement of pressure loss (cf. results of Examples 8 and 4).

Soot scavenge efficiency (%)={(S1−S2)/S1}×100

TABLE 1

| DPF material | Distribution of pore diameters* | | Average pore diameter |
|---|---|---|---|
| | 30 $\mu$m or more | 60 $\mu$m or more | |
| Cordierite | 16.06% | 5.78% | 16.1 $\mu$m |
| SiC | 6.84% | 5.01% | 10.5 $\mu$m |

*The ratio of "a grand total of a pore volume having a pore diameter within a specific range" to "a total pore volume.

TABLE 2

| | DPF material | Thickness of partition wall | Initial pressure loss |
|---|---|---|---|
| Example 1 | Cordierite | 17.0 mil (432 $\mu$m) | 470 mmH$_2$O |
| Example 2 | Cordierite | 12.0 mil (305 $\mu$m) | 290 mmH$_2$O |
| Example 3 | SiC | 25.0 mil (635 $\mu$m) | 540 mmH$_2$O |
| Example 4 | SiC | 12.0 mil (305 $\mu$m) | 260 mmH$_2$O |
| Comp. Ex. 1 | SiC | 50.0 mil (1270 $\mu$m) | 780 mmH$_2$O |

TABLE 3

| | DPF material | Thickness of partition wall | Soot scavenge efficiency |
|---|---|---|---|
| Example 5 | Cordierite | 8.0 mil (203 $\mu$m) | 90% |
| Example 6 | Cordierite | 12.0 mil (305 $\mu$m) | 93% |
| Example 7 | SiC | 5.0 mil (127 $\mu$m) | 92% |
| Example 8 | SiC | 12.0 mil (305 $\mu$m) | 97% |
| Comp. Ex. 2 | Cordierite | 6.0 mil (152 $\mu$m) | 84% |

Industrial Applicability

As described above, because high scavenging efficiency and low pressure loss and further preferable balance of them are realized by setting an appropriate thickness of partition walls based on distribution of pore diameters and an average pore diameter of filter materials, a good filter performance can be attained even in the case that the existing filter materials and production method are employed without changing properties of material and raw materials for a filter, a production method, or the like. Because of this, production is relatively easy, and the filter can flexibly cope with various uses.

What is claimed is:

1. A filter of a porous ceramics sintered body having a honeycomb structure having a large number of through channels partitioned by partition walls and passing through along an axial direction, and the partition walls have a thickness and have a plurality of pores, wherein the thickness of the partition walls and the sizes of the pores are relatively varied in a corresponding relationship to each other, characterized in that when a ratio of a pore volume having a diameter of 30 μm or more to a total pore volume, measured by a method of mercury penetration, of the filter is P1 (%) and a thickness of said partition wall is T (μm), these satisfy relationship defined by the following formula:

$$P1 \times 15 \geq T.$$

2. A filter of a porous ceramics sintered body as defined in claim 1, wherein when said ratio of a pore volume having a diameter of 30 μm or more to a total pore volume, measured by a method of mercury penetration, of the filter is P1 (%), and a thickness of said partition wall is T (μm), these satisfy relationship defined by the following formula:

$$P1 \times 20 \leq T.$$

3. A filter of a porous ceramics sintered body as defined in claim 1, wherein when said ratio of a pore volume having a diameter of 60 μm or more to a total pore volume, measured by a method of mercury penetration, of the filter is P2 (%), and a thickness of said partition wall is T (μm), these satisfy relationship defined by the following formula:

$$P2 \times 15 \leq T.$$

4. A filter of a porous ceramics sintered body as defined in claim 1, wherein when said ratio of a pore volume having a diameter of 60 μm or more to a total pore volume, measured by a method of mercury penetration, of the filter is P2 (%), and a thickness of said partition wall is T (μm), these relationship defined by satisfy the following formula:

$$P2 \times 45 \leq T.$$

5. A filter of a porous ceramics sintered body as defined in claim 1, wherein the filter is employed as a filter to capture particulates contained in exhaust gas of a diesel engine.

6. A filter of a porous ceramics sintered body as defined in claim 5, wherein that adjacent through channels are alternatively sealed at the opposite end mutually so that both end surfaces of the filter are clogged checkerwise.

7. A filter of a porous ceramics sintered body as defined in claim 1, wherein the filter has a porosity of 30–60%.

8. A filter of a porous ceramics sintered body as defined in claim 1, when an average pore diameter, measured by a method of mercury penetration, of the filter is D (μm) and a thickness of the partition wall is T (μm), these satisfy relationship defined by the following formula:

$$D \times 100 \geq T.$$

9. A filter of a porous ceramics sintered body as defined in claim 1, wherein when an average pore diameter, measured by a method of mercury penetration, of the filter is D (μm) and a thickness of the partition wall is T (μm), these satisfy relationship defined by the following formula:

$$D \times 100 \geq T.$$

10. A filter of a porous ceramics sintered body as defined in claim 2, wherein when an average pore diameter, measured by a method of mercury penetration, of the filter is D (μm) and a thickness of the partition wall is T (μm), these satisfy relationship defined by the following formula:

$$D \times 100 \geq T.$$

11. A filter of a porous ceramics sintered body having a honeycomb structure having a large number of through channels partitioned by partition walls and passing through along an axial direction, and the partition walls have a thickness and have a plurality of pores, wherein the thickness of the partition walls and the sizes of the pores are relatively varied in a corresponding relationship to each other, characterized in that when an average pore diameter, and a ratio of a pore volume having a diameter of below 3 μm to a total pore volume, measured by a method of mercury penetration, of the filter are D (μm) and P3 (%), respectively, and a thickness of said partition wall is T (μm), these satisfy relationships defined by the following two formulas:

$$(1/P3) \times 1500 \geq T \ (D \times 100) \geq T$$

and $$(1/P3) \times 400 \geq T.$$

12. A filter of a porous ceramics sintered body as defined in claim 11, wherein when said ratio of a pore volume having a diameter of 30 μm or more to a total pore volume, measured by a method of mercury penetration, of the filter is P1 (%), and a thickness of said partition wall is T (μm), these satisfy relationship defined by the following formula:

$$P1 \times 10 \leq T.$$

13. A filter of a porous ceramics sintered body as defined in claim 8, wherein when said ratio of a pore volume having a diameter of 30 μm or more to a total pore volume, measured by a method of mercury penetration, of the filter is P1 (%), and a thickness of said partition wall is T (μm), these satisfy relationship defined by the following formula:

$$P1 \times 15 \leq T.$$

14. A filter of a porous ceramics sintered body as defined in claim 8, wherein when said ratio of a pore volume having a diameter of 30 μm or more to a total pore volume, measured by a method of mercury penetration, of the filter is P1 (%), and a thickness of said partition wall is T (μm), these satisfy relationship defined by the following formula:

$$P1 \times 20 \leq T.$$

15. A filter of a porous ceramics sintered body as defined in claim 8, wherein the filter is employed as a filter to capture particulates contained in exhaust gas of a diesel engine.

16. A filter of a porous ceramics sintered body as defined in claim 15, wherein that adjacent through channels are alternatively sealed at the opposite end mutually so that both end surfaces of the filter are clogged checkerwise.

17. A filter of a porous ceramics sintered body as defined in claim 8, wherein the filter has a porosity of 30–60%.

18. A filter of a porous ceramics sintered body having a honeycomb structure having a lot of through channels partitioned by partition walls and passing through along an axial direction, and the partition walls have a thickness and have a plurality of pores, wherein the thickness of the partition walls and the sizes of the pores are relatively varied in a corresponding relationship to each other, characterized in that a ratio of a pore volume having a diameter of below 6 μm to a total pore volume, measured by a method of mercury penetration, of the filter is P4 (%) and a thickness of said partition wall is T (μm), these satisfy relationship defined by the following formula:

$$(1/P4) \times 1300 \geq T.$$

19. A filter of a porous ceramics sintered body as defined in claim 18, wherein when said ratio of a pore volume having a diameter of below 3 μm to a total pore volume, measured by a method of mercury penetration, of the filter is P3 (%) and a thickness of said partition wall is T (μm), these satisfy relationship defined by the following formula:

$$(1/P4) \times 1500 \geq T.$$

20. A filter of a porous ceramics sintered body as defined in claim 18, wherein when said ratio of a pore volume having a diameter of below 3 μm to a total pore volume, measured by a method of mercury penetration, of the filter is P3 (%) and a thickness of said partition wall is T (μm), these satisfy relationship defined by the following formula:

$$(1/P4) \times 400 \geq T.$$

21. A filter of a porous ceramics sintered body as defined in claim 18, wherein when said ratio of a pore volume having a diameter of 30 μm or more to a total pore volume, measured by a method of mercury penetration, of the filter is P1 (%) and a thickness of said partition wall is T (μm), these satisfy relationship defined by the following formula:

$$P1 \times 10 \leq T.$$

22. A filter of a porous ceramics sintered body having a honeycomb structure having a lot of through channels partitioned by partition walls and passing through along an axial direction, characterized in that a ratio of a pore volume having a diameter of below 6 μm to a total pore volume, measured by a method of mercury penetration, of the filter is P4 (%) and a thickness of said partition wall is T (μm), these satisfy relationship defined by the following formula:

$$(1/P4) \times 3000 \geq T,$$

and when said ratio of a pore volume having a diameter of 30 μm or more to a total pore volume, measured by a method of mercury penetration, of the filter is P1 (%) and a thickness of said partition wall is T (μm), these satisfy relationship defined by the following formula:

$$P1 \times 15 \leq T.$$

23. A filter of a porous ceramics sintered body having a honeycomb structure having a lot of through channels partitioned by partition walls and passing through along an axial direction, characterized in that a ratio of a pore volume having a diameter of below 6 μm to a total pore volume, measured by a method of mercury penetration of the filter is P4 (%) and a thickness of said partition wall is T (μm), these satisfy relationship defined by the following formula:

$$(1/P4) \times 3000 \geq T,$$

and when said ratio of a pore volume having a diameter of 30 μm or more to a total pore volume, measured by a method of mercury penetration, of the filter is P1 (%) and a thickness of said partition wall is T (μm), these satisfy relationship defined by the following formula:

$$P1 \times 20 \leq T.$$

24. A filter of a porous ceramics sintered body as defined in claim 18, wherein when an average pore diameter, measured by a method of mercury penetration, of the filter is D (μm) and a thickness of the partition wall is T (μm), these satisfy relationship defined by the following formula:

$$D \times 100 \geq T.$$

25. A filter of a porous ceramics sintered body as defined in claim 18, wherein when an average pore diameter, measured by a method of mercury penetration, of the filter is D (μm) and a thickness of the partition wall is T (μm), these satisfy relationship defined by the following formula:

$$D \times 70 \geq T.$$

26. A filter of a porous ceramics sintered body as defined in claim 18, wherein when an average pore diameter, measured by a method of mercury penetration, of the filter is D (μm) and a thickness of the partition wall is T (μm), these satisfy relationship defined by the following formula:

$$D \times 50 \geq T.$$

27. A filter of a porous ceramics sintered body as defined in claim 18, wherein the filter is employed as a filter to capture particulates contained in exhaust gas of a diesel engine.

28. A filter of a porous ceramics sintered body as defined in claim 27, wherein that adjacent through channels are alternatively sealed at the opposite end mutually so that both end surfaces of the filter are clogged checkerwise.

29. A filter of a porous ceramics sintered body as defined in claim 18, wherein the filter has a porosity of 30–60%.

* * * * *